(12) United States Patent
Ohki

(10) Patent No.: US 6,377,701 B1
(45) Date of Patent: Apr. 23, 2002

(54) CALIBRATION METHOD AND DEVICE, DEVICE FOR GENERATING CALIBRATION DATA AND A METHOD THEREOF, AND INFORMATION PROVIDING MEDIUM

(75) Inventor: Mitsuharu Ohki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/169,375

(22) Filed: Oct. 9, 1998

(30) Foreign Application Priority Data

Oct. 17, 1997 (JP) ............................................. 9-285896

(51) Int. Cl.⁷ ................................................. G06K 9/00
(52) U.S. Cl. ........................ 382/154; 382/285; 345/629
(58) Field of Search ................................. 382/152, 154, 382/153, 284, 294, 285; 356/3, 14, 12, 631; 250/559.23, 559.31; 348/47, 50; 345/419, 629, 630

(56) References Cited

U.S. PATENT DOCUMENTS

| | | | | |
|---|---|---|---|---|
| 5,694,483 A | * | 12/1997 | Onoguchi | 382/154 |
| 5,818,959 A | * | 10/1998 | Webb et al. | 382/154 |
| 5,852,672 A | * | 12/1998 | Lu | 382/154 |
| 6,028,955 A | * | 2/2000 | Cohen et al. | 382/154 |
| 6,072,898 A | * | 6/2000 | Beaty et al. | 382/146 |
| 6,123,427 A | * | 9/2000 | Hinderling | 359/529 |

OTHER PUBLICATIONS

M. Okutomi et al., "A Multiple–Baseline Stereo," IEICE Transactions on Information and Systems, vol. E75–D, No. 5, Article Published Aug. 1992, pp. 1317–1327, Abstract Published Sep. 1992, pp. 744–745.

* cited by examiner

*Primary Examiner*—Bhavesh Mehta
*Assistant Examiner*—Ali Bayat
(74) *Attorney, Agent, or Firm*—Bell, Boyd & Lloyd LLC (57) ABSTRACT

A plate 5 provided with a square lattice-work pattern thereupon is provided in the same space with two cameras 1 and 2 and a theodolite 4. This plate—unlike known plates, which have been around 4 meters by 3 meters in size and consequently so great as to make precise drawing of the square lattice-work pattern difficult, resulting in calibration with low precision—is about 1.5 meters by 1 meter in size, for example. As the plate is small, a precise square lattice-work pattern can be drawn thereupon. The theodolite 4 measures 3-dimensional coordinates for at least two set positions of the plate 5. Then, calibration is performed using the image data obtained by the two cameras 1 and 2 imaging the square lattice-work pattern and the 3-dimensional coordinates measured with the theodolite.

21 Claims, 11 Drawing Sheets

CALIBRATION METHOD AND DEVICE, DEVICE FOR GENERATING CALIBRATION DATA AND A METHOD THEREOF, AND INFORMATION PROVIDING MEDIUM

BACKGROUND OF THE INVENTION

1. Field of the Invention

The present invention relates to a calibration method and device, a device for generating calibration data and a method thereof, and information providing medium; whereby information regarding the position of an object in 3-dimensional space is calculated from 2-dimensional images obtained by imaging devices which perform imaging of the object.

2. Description of the Related Art

There is a known stereo camera system serving as a 3-dimensional position detecting device, in which a plurality (e.g., two) of video cameras (hereafter simply referred to as "cameras") are used to comprise a so-called stereo camera by which an object in a 3-dimensional space is imaged and the position of the object in the 3-dimensional space is determined based on the 2-dimensional images obtained by the imaging.

Details of a stereo camera system are disclosed in detail in MASATOSHI OKUTOMI and TAKEO KANEIDE: "Stereo Matching Using Multiple Base-Line Lengths", Institute of Electronics, Information and Communication Engineers Journal D-II, Vol. J75-D-II. No. 8, pp. 1317–1327 (August 1992), and so forth.

With a stereo camera system, an object whose positional information in 3-dimensional space is to be obtained is imaged by multiple cameras, and information regarding the position of the object in 3-dimensional space can be obtained from the positional information of the object projected on a light-receiving plane (hereafter referred to as "screen") of the photo-electric converting devices (e.g., CCD) of each camera. Accordingly, in the event that there is positional information of an object existing at a certain position within a 3-dimensional space, and an object at that position, the correlated relation with the positional information of the object projected on the screen of each camera (correlated relation of position information) must be determined beforehand. The process of obtaining this correlated relation of position information is referred to as "calibration", and is carried out by a calibration device.

Figure 8:
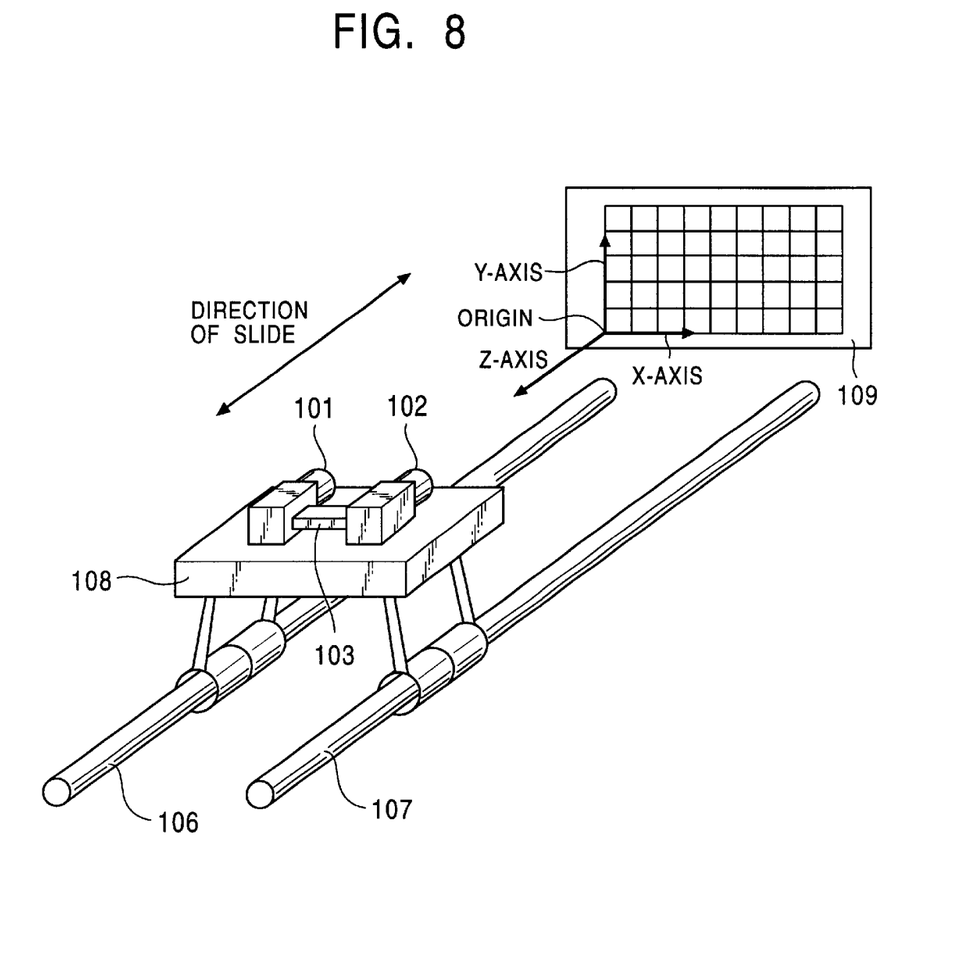
FIG. 8 is a constructional diagram of a known calibration device.

FIG. 8 is an external perspective view of a known calibration device for performing calibration. In FIG. 8, pipes 106 and 107 are included in the same plane in a 3-dimensional space, and a carriage 108 is provided so as to smoothly move along the pipes 106 and 107. Attached to the carriage 108 is a stereo camera, comprised of a first camera 101 and a second camera 102 which have been integrally joined by means of a metal piece 103.

The pipes 106 and 107 are inscribed with scale marks, so as to enable measuring the distance that the carriage 108 slides. A plate 109 with a square lattice-work pattern drawn thereupon is provided in a direction perpendicular to the direction of sliding of the carriage 108. The horizontal direction of the square lattice-work serves as the X-axis, the vertical direction thereof as the Y-axis, and the direction of sliding, i.e., the direction perpendicular to the square lattice-work is the Z-axis. Z>0 holds for the side of the plate 109 on which the camera is provided. Such a 3-dimensional coordinates system with the X-axis, Y-axis, and Z-axis, is defined as a "world coordinates" system.

Figure 9:
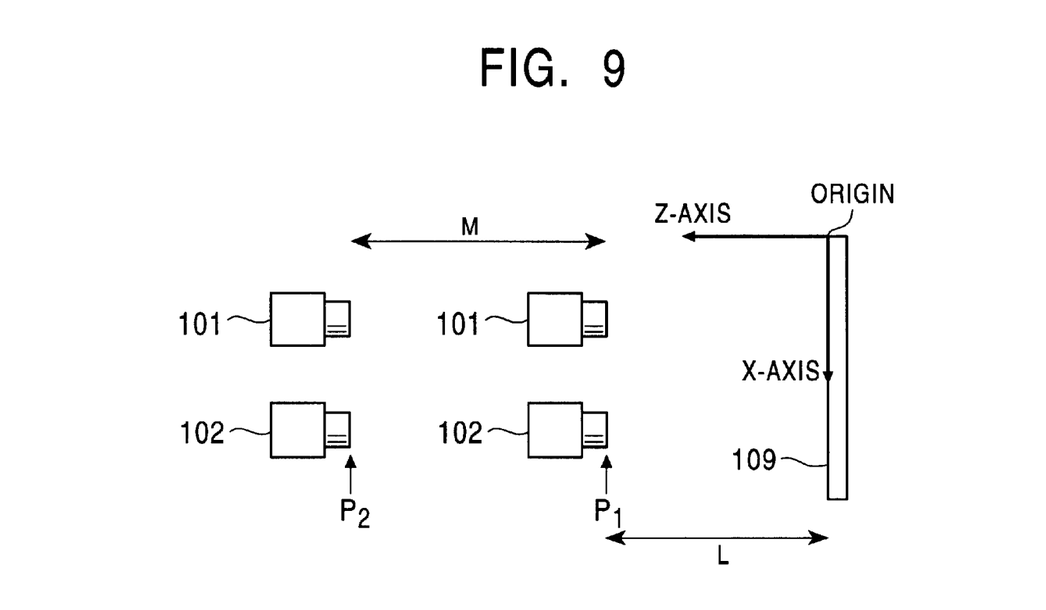
FIG. 9 is a diagram showing the stereo camera of the known calibration device shown in FIG. 8 being slid.

Calibration measurement is performed by shifting the carriage 108 carrying the aforementioned stereo camera along the Z-axis, and imaging the plate 109 from two positions. FIG. 9 is a diagram describing a case in which imaging is performed from two positions, viewing the device shown in FIG. 8 from directly above.

First, the first camera 101 and the second camera 102 are fixed at a certain position P1, the plate 109 is imaged such that the square lattice-work pattern is recorded, following which the first camera 101 and the second camera 102 are slid along the Z-axis to another position P2 by a distance of M by means of sliding the carriage 108, and the plate 109 is imaged once more. Here, FIG. 9 shows the first camera 101 and the second camera 102 being moved in a direction away from the plate 109, but this direction of sliding may be reversed.

Figure 10:
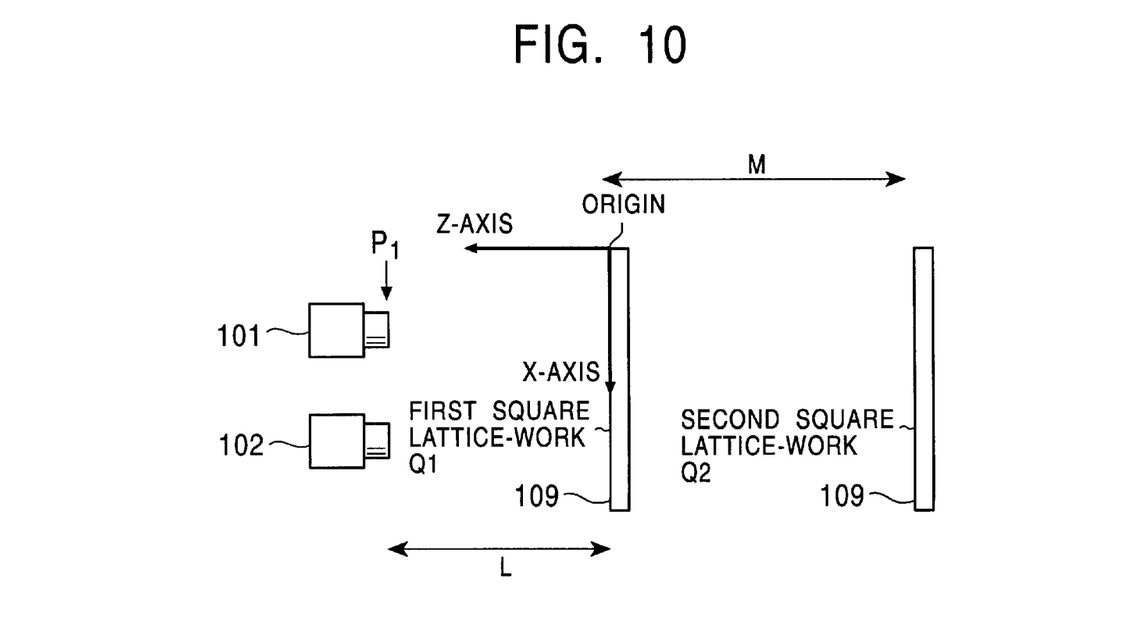
FIG. 10 is a diagram equivalent to the diagram shown in FIG. 9.

Thus, the 2-dimensional images obtained by means of sliding a stereo camera comprised of the first camera 101 and the second camera 102 and imaging the plate 109 can also be obtained by means of an arrangement wherein the stereo camera is fixed and the plate 109 is shifted instead as well, as shown in FIG. 10.

That is to say, the same 2-dimensional images can be obtained by an arrangement such as shown in FIG. 10, wherein the first camera 101 and the second camera 102 are fixed to a certain position P1, the plate 109 is imaged such that the square lattice-work pattern is recorded, following which the plate 109 is slid along the Z-axis by a distance of M to another position P2 in a direction away from the first camera 101 and the second camera 102, and the plate 109 is imaged once more at that position.

In FIG. 10, with the lower left corner of the square lattice-work pattern drawn on the plate before moving the plate by a distance of M (first square lattice-work pattern Q1) serving as the origin point and also as the origin for the world coordinates system, the position (i, j) on the first square lattice-work pattern Q1 for the plate 109 is (i, j, O) on the world coordinates. Also, the position (i, j) on the second square lattice-work pattern Q2 after the plate 109 has been shifted by a distance of M is (i, j, –M) on the world coordinates.

Figure 11:
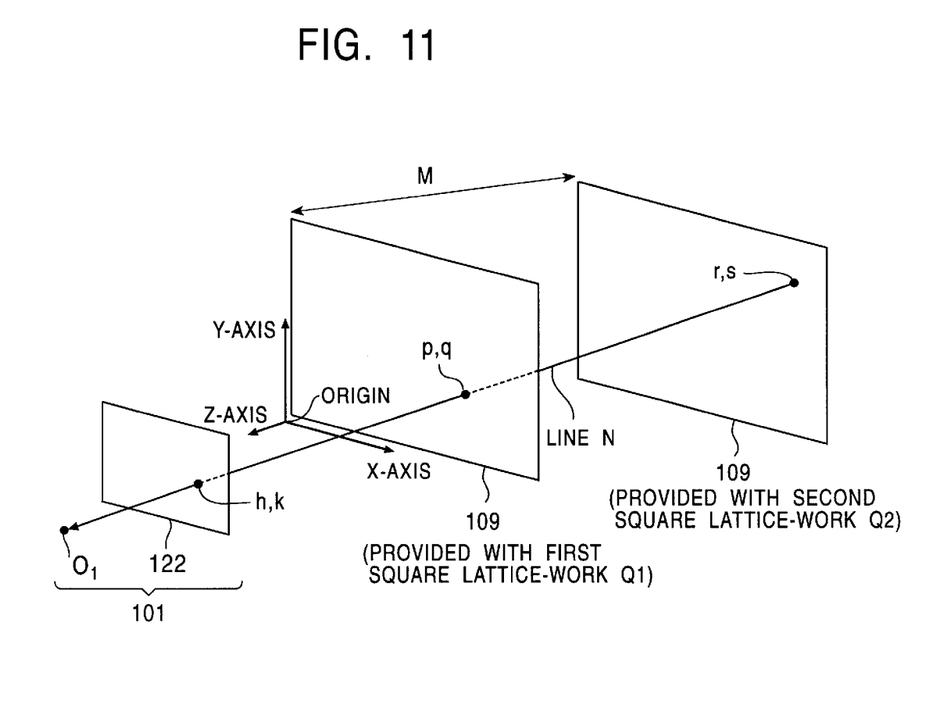
FIG. 11 is an explanatory diagram of a calibration method with a known calibration device.

FIG. 11 shows the first camera 101, and the first square lattice-work Q1 and second square lattice-work Q2 on the plate 109. The optical center of the first camera 101 is 01, and positional information of the object is case upon the screen serving as the light-receiving surface of a CCD 122 or the like. For example, let us say that coordinates position (p, q) at the first square lattice-work Q1 is projected, and coordinates position (r, s) at the second square lattice-work Q2 is projected. Incidentally, the coordinates of positions other than upon the vertical and horizontal lines in the grid can be calculated by interpolation.

Giving the same description once more using world coordinates, 3-dimensional coordinates positions (p, q, O) and (r, s, –M) are projected onto the coordinates position (h, k) on the CCD 122. That is, in the event that the 2-dimensional coordinates position (h, k) and the 3-dimensional coordinates positions (p, q, O) and (r, s, –M) are connected by a line N, all points on this line N are projected onto the coordinates position (h, k) on the CCD 122.

Accordingly, the line N represents a correlated relation (correlated relation of position information) between positional information of objects in a 3-dimensional space (in this case, coordinates in the world coordinates system), and 2-dimensional information obtained by imaging the object (in this case, coordinates on the 2-dimensional coordinates system on the CCD 122).

This line N can be calculated as follows:

(x−r)/(p−r)=(y−s)/(q−s)=(z+M)/M

In the same manner as calculating line N, lines projected on other coordinates positions as collections of points in the 3-dimensional space are also calculated for the other 2-dimensional coordinate systems on the CCD, as well. The same is also carried out with the second camera 102.

Thus, by calculating all lines for the first camera 101 and the second camera 102, calibration of the stereo camera system is completed.

The positional information of an object in the 3-dimensional space can be calculated as follows, using a stereo camera system which has been calibrated as described above.

Figure 12:
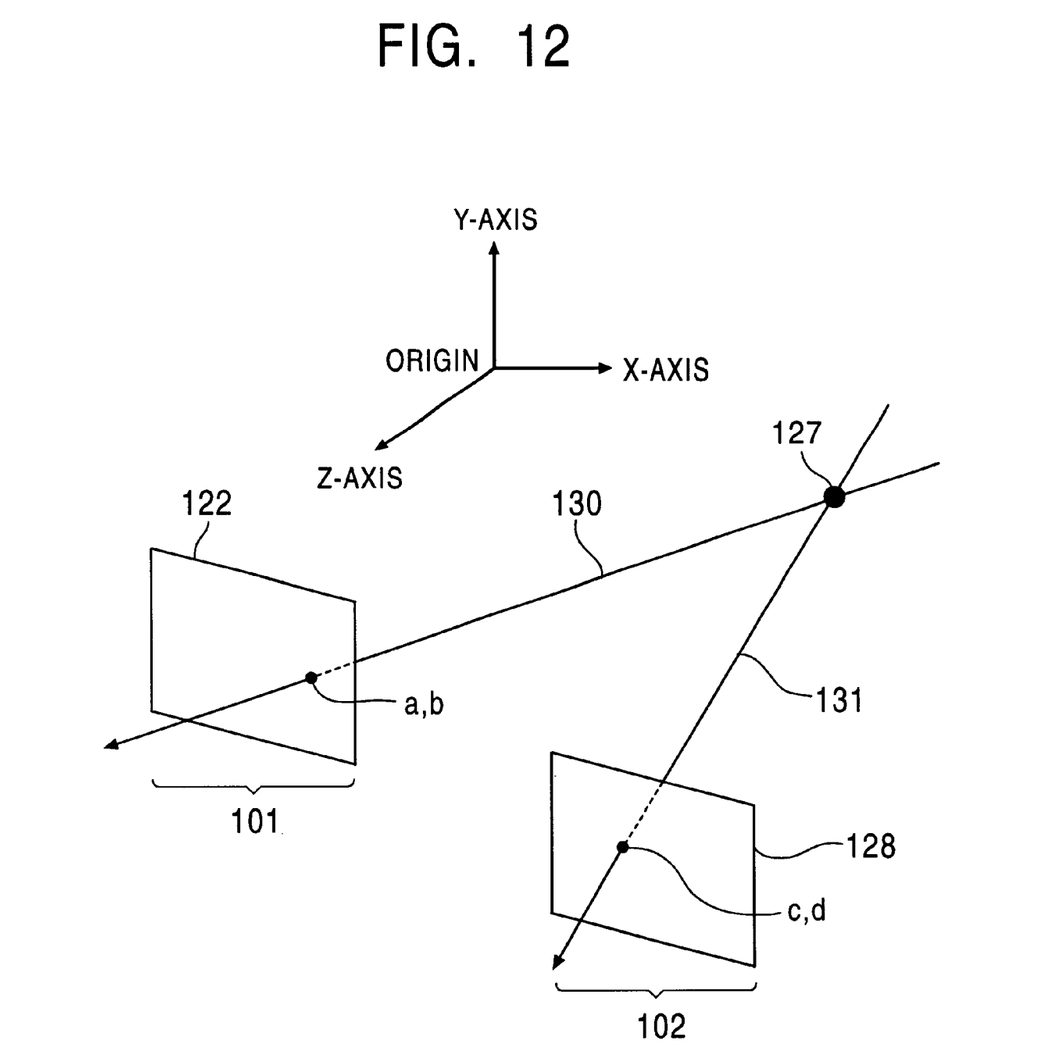
FIG. 12 is an explanatory diagram relating to stereo viewing with a calibrated stereo camera.

First, an object is imaged using the stereo camera. For example, let us say that the object 127 shown in FIG. 127 is projected at the position (a, b) on the screen 122 of the first camera 101 and the position (c, d) on the screen 128 of the second camera 102. The lines 130 and 131 on the world coordinates system corresponding with the positions (a, b) and (C, d) have already been determined in the calibration (initialization) of the above calibration device, so it is possible to calculation the point of intersection of these lines on the world coordinates system. Thus, the positional of an object in 3-dimensional space can be measured.

Summarizing the above: first, measurement is made regarding at which position on the screens 122 and 128 of the first camera 101 and the second camera 102 the object has been projected. Next, the point of intersection of the lines 130 and 131 which each correspond with each of the positions of projection is calculated on the world coordinates system. This point of intersection is the position of the object on the world coordinates system, i.e., in the 3-dimensional space.

Now, with the calibration device shown in FIG. 8, with the distance L between the first and second cameras 101 and 102 and the plate 109 as several meters, an area around 4 meters by 3 meters becomes necessary for the area on which the square lattice-work pattern is made on the plate 109. The reason is: in the event that the area on which the square lattice-work pattern is made is small, the square lattice-work pattern is not projected on the periphery of the CCD (screen) 122 shown in FIG. 11 when being imaged by the camera, so the line N regarding pixels at the periphery thereof cannot be calculated.

However, it has been difficult to fabricate a precise square lattice-work pattern of such a size as 4 meters by 3 meters. Accordingly, only square lattice-work pattern with a certain degree of warping could be provided, and consequently, highly precise calibration could not be carried out.

SUMMARY OF THE INVENTION

The present invention has been made in light of the above-described present state, and accordingly, it is an object of the present invention to provide a calibration method and device, capable of performing highly precise calibration using a reference object provided with square lattice-work pattern of a size which can be fabricated with precision.

It is another object of the present to provide a method for generating data for calibration, capable of performing highly precise calibration using a reference object provided with square lattice-work pattern of a size which can be fabricated with precision.

According to one aspect of the present invention, a calibration method for calibrating an imaging device for determining positional information of an object in a 3-dimensional space based on 2-dimensional images obtained from the imaging device conducts calibration of the imaging device based on 3-dimensional coordinates at least two positions of a reference object set within a 3-dimensional space confined to the range in which the imaging device performs imaging, and image data obtained by the imaging device performing imaging of the reference object at each set position.

According to another aspect of the present invention, a calibration device for calibrating an imaging device for determining positional information of an object in a 3-dimensional space based on 2-dimensional images obtained from the imaging device, comprises a reference object set in a 3-dimensional space within the range in which the imaging device performs imaging of the object, 3-dimensional position information measuring means for measuring the 3-dimensional coordinates position of the reference object, and control means for generating calibration information for the imaging device, based on 3-dimensional coordinates at least two positions of a reference object set within a 3-dimensional space confined to the range in which the imaging device performs imaging, and image data obtained by the imaging device performing imaging of the reference object at each set position.

According to a further aspect of the present invention, a calibration data generating method for generating data for calibrating an imaging device which determines positional information of an object in a 3-dimensional space based on 2-dimensional images obtained from the imaging device comprises the steps of: receiving data indicating 3-dimensional position information of the reference object which has been measured multiple times by a 3-dimensional position information measuring device; receiving image data of the pattern which has been measured multiple times by the imaging device; and generating data for calibration for obtaining a 3-dimensional space position projected on each position of the screens of the imaging device, based on both types of data.

According to a yet another aspect of the present invention, a calibration data generating device for generating data for calibrating an imaging device which determines positional information of an object in a 3-dimensional space based on 2-dimensional images obtained from the imaging device comprises: a first receiving unit for receiving data indicating 3-dimensional position information of the reference object which has been measured multiple times by a 3-dimensional position information measuring device; a second receiving unit for receiving image data of the pattern which has been measured multiple times by the imaging device; and a control unit for generating data for calibration for obtaining a 3-dimensional space position projected on each position of the screens of the imaging device, based on both types of data.

According to a still another aspect of the present invention, an information providing medium which provides control information for calibrating an imaging device for determining positional information of an object in a 3-dimensional space based on 2-dimensional images obtained from the imaging device conducts calibration of the imaging device based on 3-dimensional coordinates at least two positions of a reference object set within a 3-dimensional space confined to the range in which the imaging device performs imaging, and image data obtained by the imaging device performing imaging of the reference object at each set position.

DESCRIPTION OF THE PREFERRED EMBODIMENTS

Embodiments of the calibration method and device according to the present invention shall now be described with reference to the drawings.

First, description shall be made regarding an embodiment of the above calibration method. This embodiment is a calibration method wherein calibration is performed by a stereo camera comprised of two cameras, and is realized using a stereo camera such as shown in FIG. 1, a 3-dimensional position measuring device 4, and a plate 5.

According to this calibration method, the stereo camera which performs calibration is comprised of a first camera 1 and a second camera 2 integrally joined by means of a metal piece 3. That is to say, the positional relation of the two cameras is fixed.

According to the known device shown in FIG. 8 as described above, the aforementioned two cameras are moved to carry out calibration, but with the present calibration method, the aforementioned stereo cameras are fixed. For example, the two cameras may be attached to a fixed tripod or the like which is omitted from the drawings.

Figure 1:
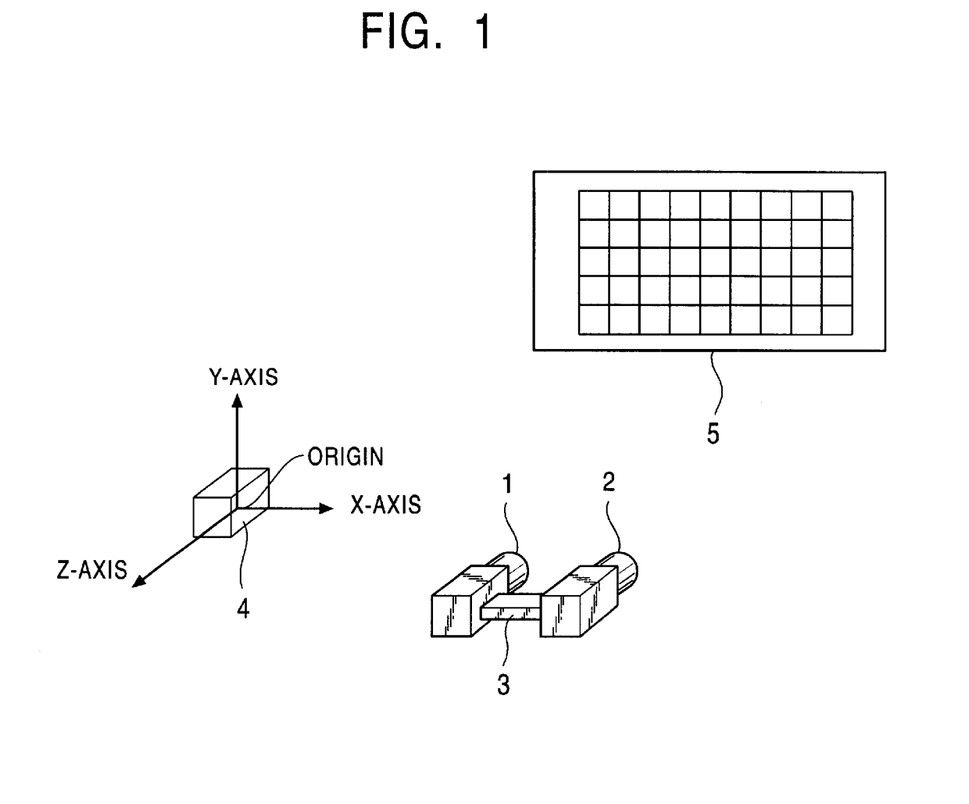
FIG. 1 is a diagram for describing an embodiment of the calibration method according to the present invention.

A theodolite 4 which serves as a 3-dimensional position measuring device is positioned in the same space as these two cameras, as shown in FIG. 1. This theodolite is a machine which measures the position of objects using a 3-dimensional coordinates system (this coordinates system shall be used as the reference in the following description, and accordingly, shall be referred to as "world coordinates system") with itself as the point of origin. This machine will be described in greater detail later. Accordingly, FIG. 1 shows the world coordinates system with the theodolite 4 at the center thereof.

Also, the above-described plate 5 provided with the square lattice-work pattern is positioned in the same space as the two cameras 1 and 2, and the above theodolite 4. This plate, unlike known plates is about 1.5 meters by 1 meter in size, for example. As the plate is small, a precise square lattice-work pattern can be drawn thereupon. However, since the square lattice-work pattern of the plate 5 is small, there is no need for the square lattice-work pattern to shows on the entirety of the screens of the cameras in the event that this is imaged with the above two cameras.

Figure 2:
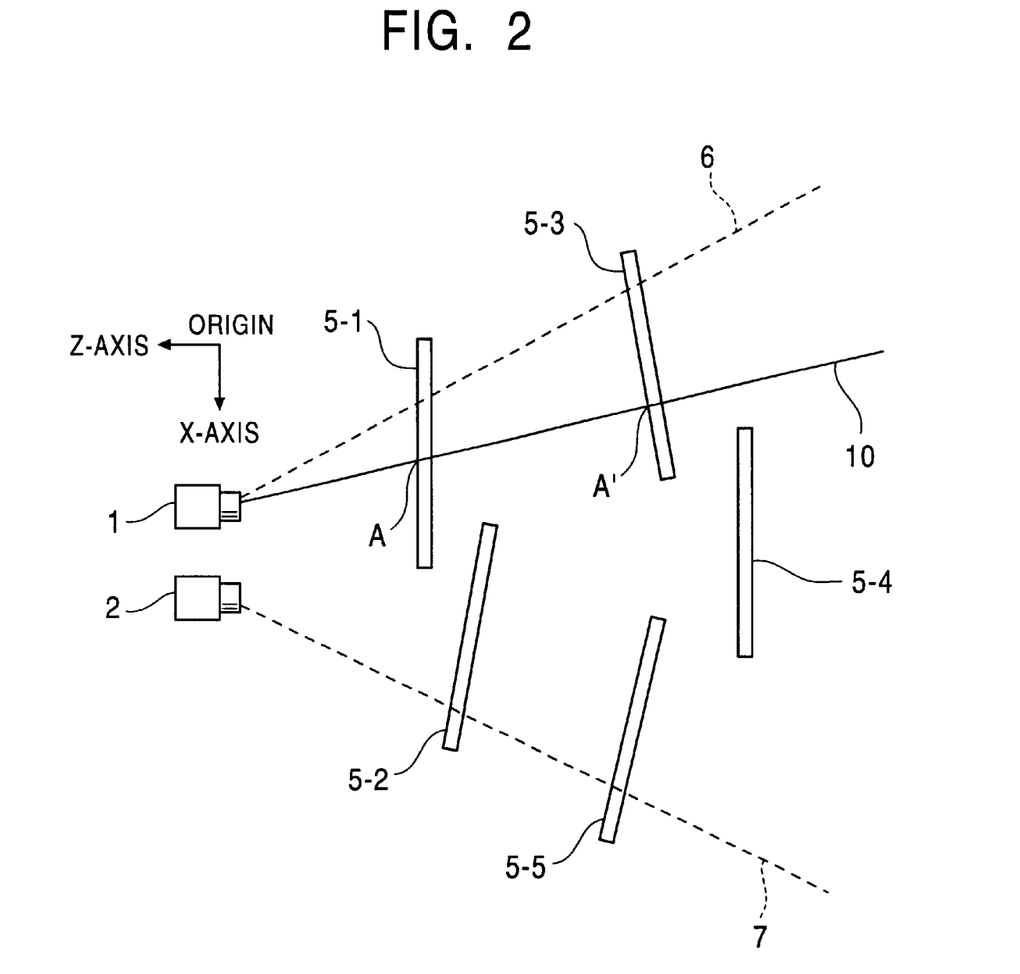
FIG. 2 is a diagram for describing a specific example of the calibration method executed using the components shown in FIG. 1.

FIG. 2 shows a diagram for describing a specific example of a calibration method which is executed using the components shown in FIG. 1. This FIG. 2 views the components shown in FIG. 1 directly from above. In FIG. 2, the area encompassed by the dotted line 6 and the dotted line 7 is the area which is imaged by the first camera 1 and the second camera 2. The theodolite 4 is omitted from the Figure, but is understood to exist at the center of the world coordinates system. The Y-axis of the world coordinates system is perpendicular to the plane of the paper.

First, the square lattice-work pattern plate 5 is positioned at a location shown as 5-1 in FIG. 2. Then, the position of the square lattice-work pattern when positioned at 5-1 is measured by the theodolite. Accordingly, the position in the world coordinates system of each of the points in the square lattice-work pattern when positioned at 5-1 can be known.

Next, in this state, imaging is performed by the first camera 1 and the second camera 2. Then, the following processing is performed on the screen of each camera regarding only the position at which the square lattice-work pattern is projected.

The "position of the square lattice-work pattern (position on the world coordinates system)" projected on "a certain position on the screen" is checked, and the "position of the square lattice-work pattern" is registered as the 3-dimensional position corresponding with the "position on the screen". This registration is performed regarding all "positions on the screen".

Next, the square lattice-work pattern plate 5 is positioned at a location shown as 5-2 in FIG. 2. Then, the position of the square lattice-work pattern when positioned at 5-2 is measured by the theodolite. Accordingly, the position in the world coordinates system of each of the points in the square lattice-work pattern when positioned at 5-2 can be known.

Next, in this state, imaging is performed by the first camera 1 and the second camera 2. Then, the following processing is performed on the screen of each camera regarding only the position at which the square lattice-work pattern is projected.

The "position of the square lattice-work pattern (position on the world coordinates system)" projected on "a certain position on the screen" is checked, and the "position of the square lattice-work pattern" is registered as the 3-dimensional position corresponding with the "position on the screen". This registration is performed regarding all "positions on the screen".

In the same manner, the square lattice-work pattern plate 5 is placed at positioned shown by 5-3, 5-4, and 5-5 in FIG. 2, and the "positions of the square lattice-work pattern" are registered as the 3-dimensional positions corresponding with the "positions on the screen".

What is noteworthy here is that two or more "positions of the square lattice-work pattern" are registered to each "position on the screen". In the event that there is only one registered, or none registered, the following operation is performed once more: the plate is moved such that the square lattice-work pattern is projected into the "position on the screen", the position of the square lattice-work pattern is measured, and the projected "position of the square lattice-work pattern" is registered as the position corresponding with each "position on the screen".

Now, calibration consists of checking which line on the world coordinates system is projected on each "position on the screen".

Figure 3:
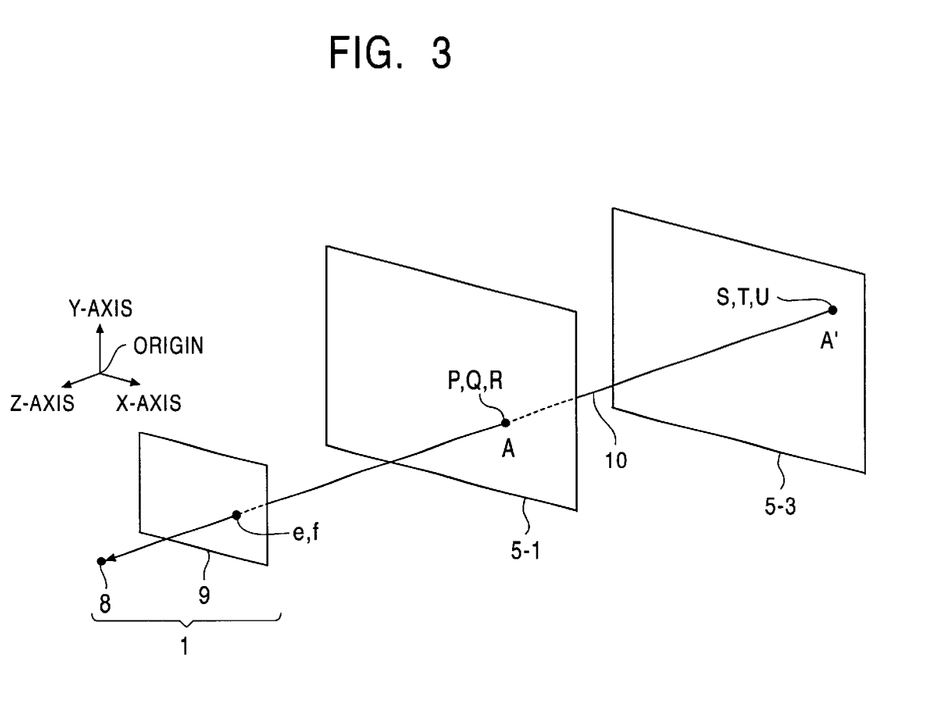
FIG. 3 is a diagram for describing the principle of the above calibration method.

As described above, two or more "positions of square lattice-work pattern (positions on the world coordinates system)" are registered to a "position on the screen". Now, as shown in FIG. 3, let us focus on a certain position on the screen 9 of the first camera 1. This point shall be denoted as (e, f). Two or more "positions of square lattice-work pattern (positions on the world coordinates system)" corresponding with (e, f) are registered. This means that all points on the "positions of square lattice-work pattern (on the world coordinates system)" are projected on (e, f). Accordingly, all points on a line connecting the plurality of "positions of square lattice-work pattern (positions on the world coordinates system)" are projected on (e, f). Hence, the line connecting the plurality of "positions of square lattice-work pattern (positions on the world coordinates system)" registered correspondingly to (e, f) is calculated. The obtained line is a line corresponding with (e, f).

In the same manner, lines corresponding with all other positions on the screen 9 of the camera 1 other than (e, f), and all positions on the screen of the camera 2 are calculated, thus completing calibration.

Hence, an object can be imaged with the above stereo camera and the position of the object in 3-dimensional space can be obtained. Specific description is the same as that made with the above FIG. 2.

Now, description will be made in further detail regarding the method of obtaining the line corresponding with (e, f), as described above. In FIG. 3, reference numeral 8 denotes the optical center of the first camera 1. Positional information of the object is projected onto the screen 9 which serves as the light-receiving surface (e.g., CCD or the like). Let is say that the square lattice-work pattern is projected into the position (e, f) on the screen 9 at the times that the square lattice-work pattern plate 5 is placed at 5-1 and placed at 5-3.

It can be determined from the image taken with the plate 5 positioned at 5-1 at which point on the square lattice-work pattern the point projected to (e, f) is. This is referred to as point A. Incidentally, even in the event that point A is a position other than an intersection between the vertical and horizontal lines of the square lattice-work pattern, the position thereof can be determined by interpolation. Now, the position of the square lattice-work pattern when the plate 5 is placed at 5-1 is measured with reference to the world coordinates system, and accordingly, it can be known at which position point A is on the world coordinates system. This is (P, Q, R), for example.

Also, it can be determined from the image taken with the plate 5 positioned at 5-3 at which point on the square lattice-work pattern the point projected to (e, f) is. This is referred to as point A'. Incidentally, even in the event that point A' is a position other than an intersection between the vertical and horizontal lines of the square lattice-work pattern, the position thereof can be determined by interpolation. Now, the position of the square lattice-work pattern when the plate 5 is placed at 5-3 is measured with reference to the world coordinates system, and accordingly, it can be known at which position point A' is on the world coordinates system. This is (S, T, U), for example.

Accordingly, it can be understood that the point (P, Q, R) and the point (S, T, U) are projected onto the position (e, f) on the screen. Hence, it can be understood that all points on the line N (denoted by reference numeral 10 in FIG. 3) on the world coordinates system are projected into (e, f) on the screen 9. However, the expression (X−S)/(P−S)=(Y−T)/(Q−T)=(Z−U)/(R−U)

holds for line N. FIG. 3 is shown with the same reference numerals as FIG. 2.

Thus, calculation can be made regarding what sort of a line's points on the world coordinates system are projected on the position (e, f) of the screen 9 of the camera 1.

Incidentally, while description regarding FIG. 3 has been made as if the screen 9 is positioned between the plate 5 and the optical center 8, but this is because FIG. 3 is a diagram for making simple description of the relation between a point on the object, the optical center, and a point on the screen; in reality, the it exists at a symmetrical point across from the optical center 8 with the optical center 8 serving as the symmetrical center. That is to say, it is positioned behind the optical center 8 as viewed from the screen.

Now, description shall be made regarding the theodolite 4 shown in FIG. 1 which serves as a 3-dimensional position measuring device.

Figure 4:
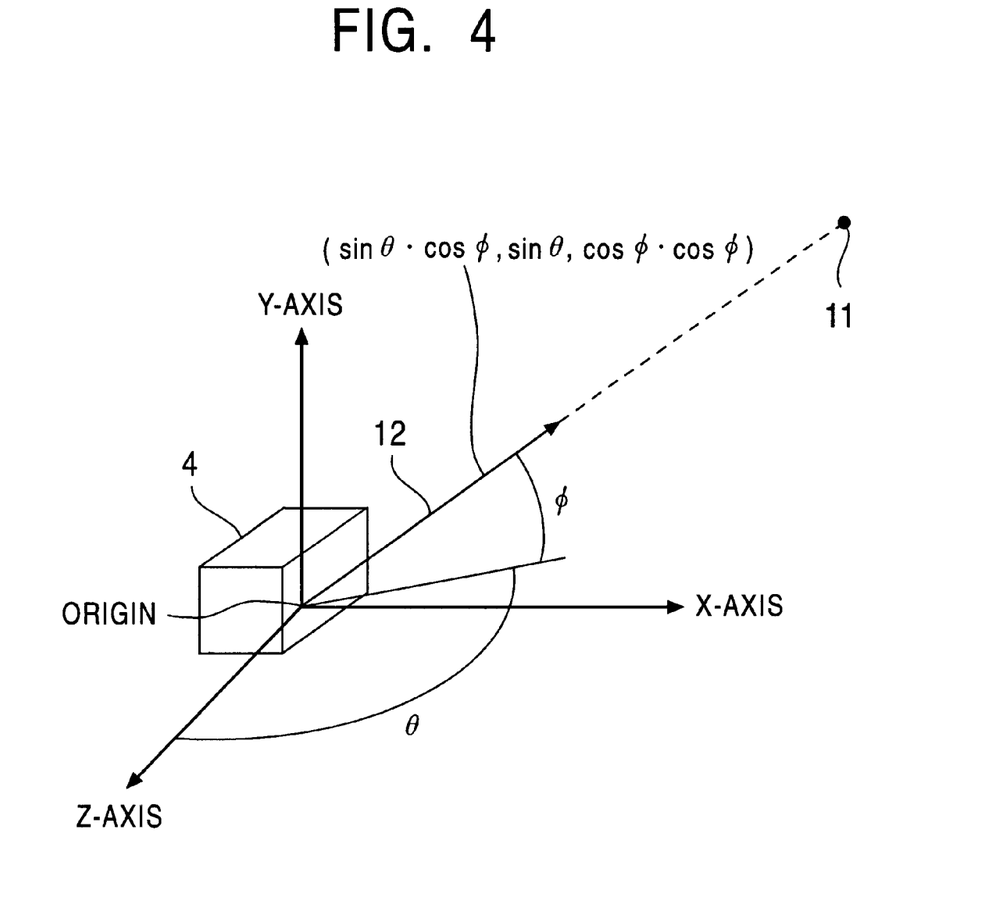
FIG. 4. is a diagram for describing the theodolite for use with the above calibration method.

The theodolite is a machine which can measure at which angle an object exists, with itself as the center. FIG. 4 is a diagram for describing the theodolite 4. Sighting the theodolite 4 on the object 1 enables finding the angle from the X-Z plane (θ in the Figure) and the elevation angle from the X-Z plane to the X-axis (φ in the Figure), as to the coordinates axes centered at the theodolite 4 (shown in the Figure). That is, the unit vectors (sin θ×cos φ, sin φ, and cos θ×cos φ) can be obtained.

Figure 5:
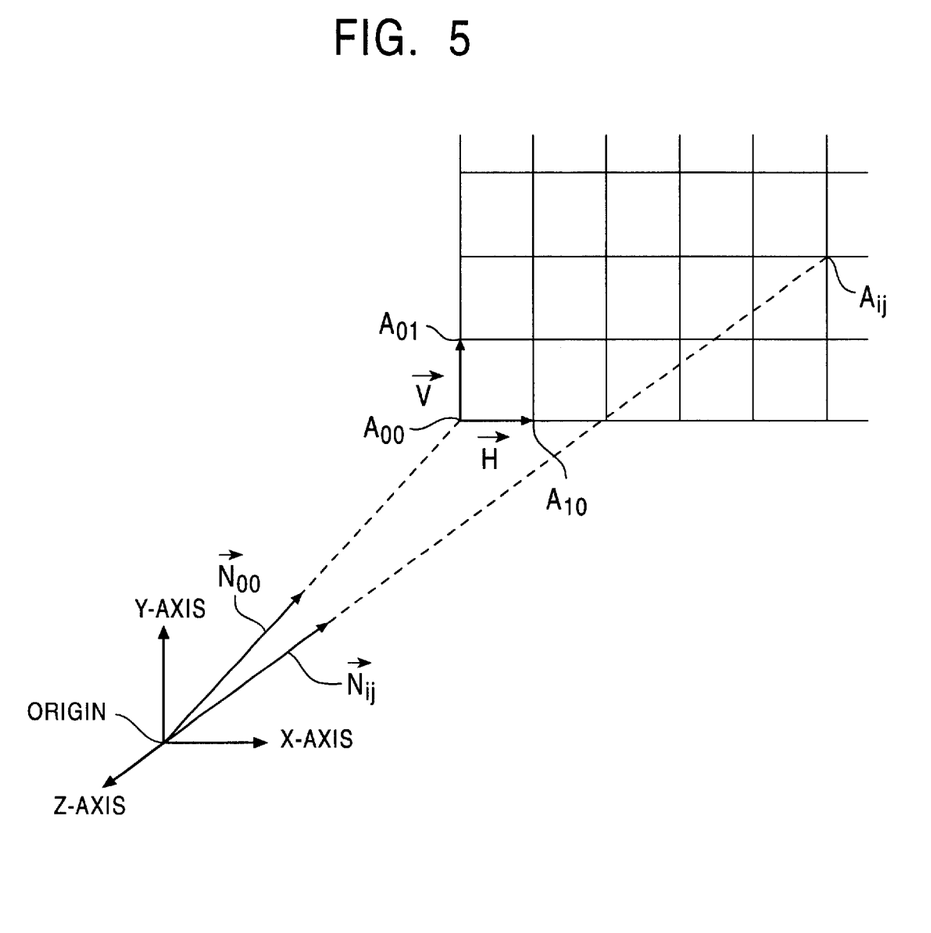
FIG. 5 is a diagram for describing the principle for measurement of the position of the square lattice-work pattern using the theodolite in the above calibration method.

The position of the square lattice-work pattern is measured as shown in FIG. 5, using the theodolite 4. Although the theodolite 4 is omitted in the Figure, it is positioned at the center of the coordinate axes. Symbols are provided to the intersections of each vertical line and horizontal line of the grid in the positive direction. That is, as shown in the Figure, numbers are provided so that $A_{00}$ is provided to the far left end, $A_{10}$ to the neighboring right of $A_{00}$, $A_{01}$ to the position immediately above $A_{00}$, and so forth.

The vector from $A_{00}$ to $A_{10}$ is denoted as "H vector". The vector from $A_{00}$ to $A_{01}$ is denoted as "V vector". The spacing of the square lattice-work is constant at all parts, so the positional relation with each intersection $A_{ij}$ and the intersection to the right thereof is H vector, and the relation with the point above is V vector. Now, the H vector and V vector are 3-dimensional vectors in the 3-dimensional coordinates system shown in the Figure (a 3-dimensional coordinates system with the theodolite as the center thereof). The theodolite is sighted on $A_{00}$ and the unit vector from the origin to $A_{00}$ ($N_{00}$ vector) is obtained. Sighting is made to other intersections $A_{ij}$ in the same manner, and the unit vector ($N_{ij}$ vector) from the origin to $A_{ij}$ is obtained for each. Now, setting the distance from the origin to $A_{00}$ or to $A_{ij}$ as $K_{00}$ or $K_{ij}$ yields the following Expression 1 or Expression 2:

3-dimensional position of $A_{00}=K_{00}\times N_{00}$ (1)

3-dimensional position of $A_{ij}=K_{ij}\times N_{ij}$ (2)

The intersection i counts to the right from $A_{00}$ and j counts upwards therefrom is $A_{ij}$, so the positional relation is i×(H vector)+j×(V vector), yielding the following Expression 3:

$K_{ij}\times N_{ij}=K_{00}\times N_{00}+i\times H+j\times V$ (3)

Further, the length of one side of the square lattice-work is 10 cm, for example, as in the following Expression 4:

$|H|=|V|=10$ cm (4)

The length of one side can be found by measuring the square lattice-work pattern directly with a ruler or the like.

The value of the H vector, the value of the V vector, and the value of $K_{ij}$ can be calculated from Expression 3 and Expression 4.

The $N_{ij}$ vector obtained using the theodolite, and the $K_{ij}$ calculated from the above calculation are substituted in the above Expression 2, to calculate the position of $A_{ij}$ Positions of the square lattice-work pattern other than intersections ($A_{ij}$) are obtained by interpolation.

Thus, the position of the square lattice-work pattern on the coordinates system with the theodolite as the reference (world coordinates system) can be obtained by using the theodolite.

Figure 6:
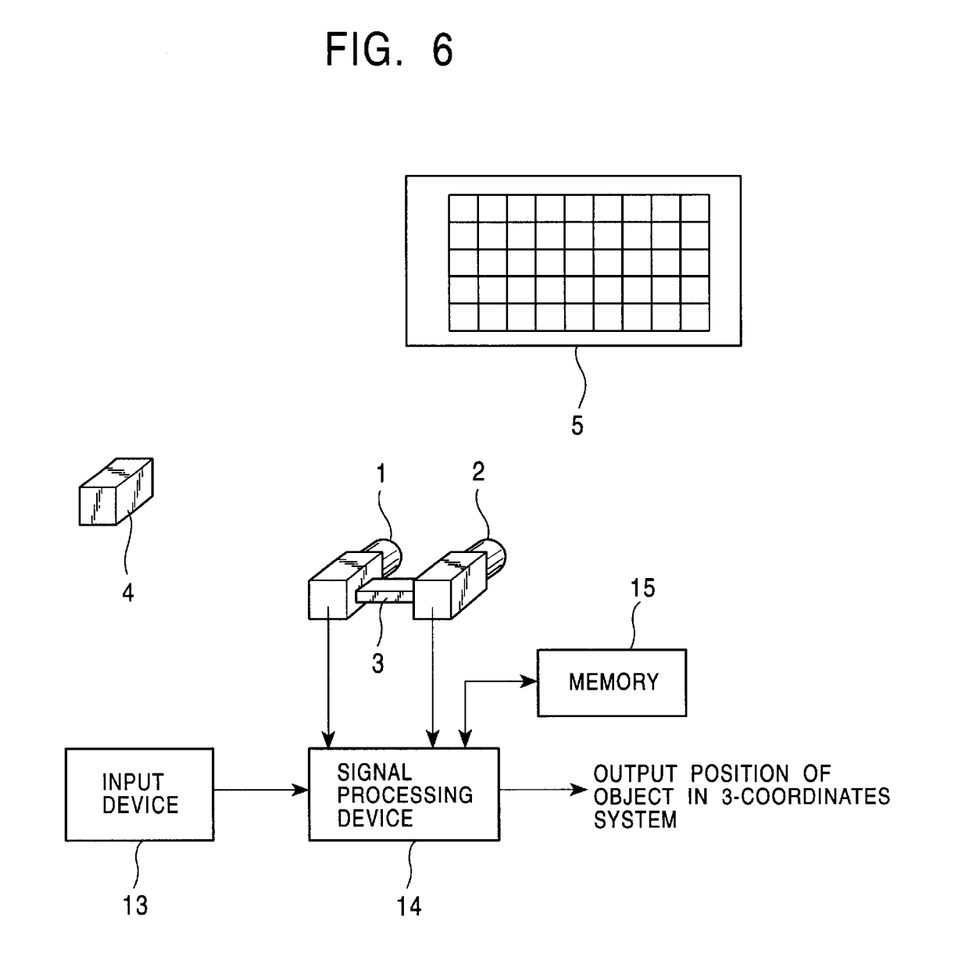
FIG. 6 is a block diagram of an embodiment of the calibration device according to the present invention.
Figure 7:
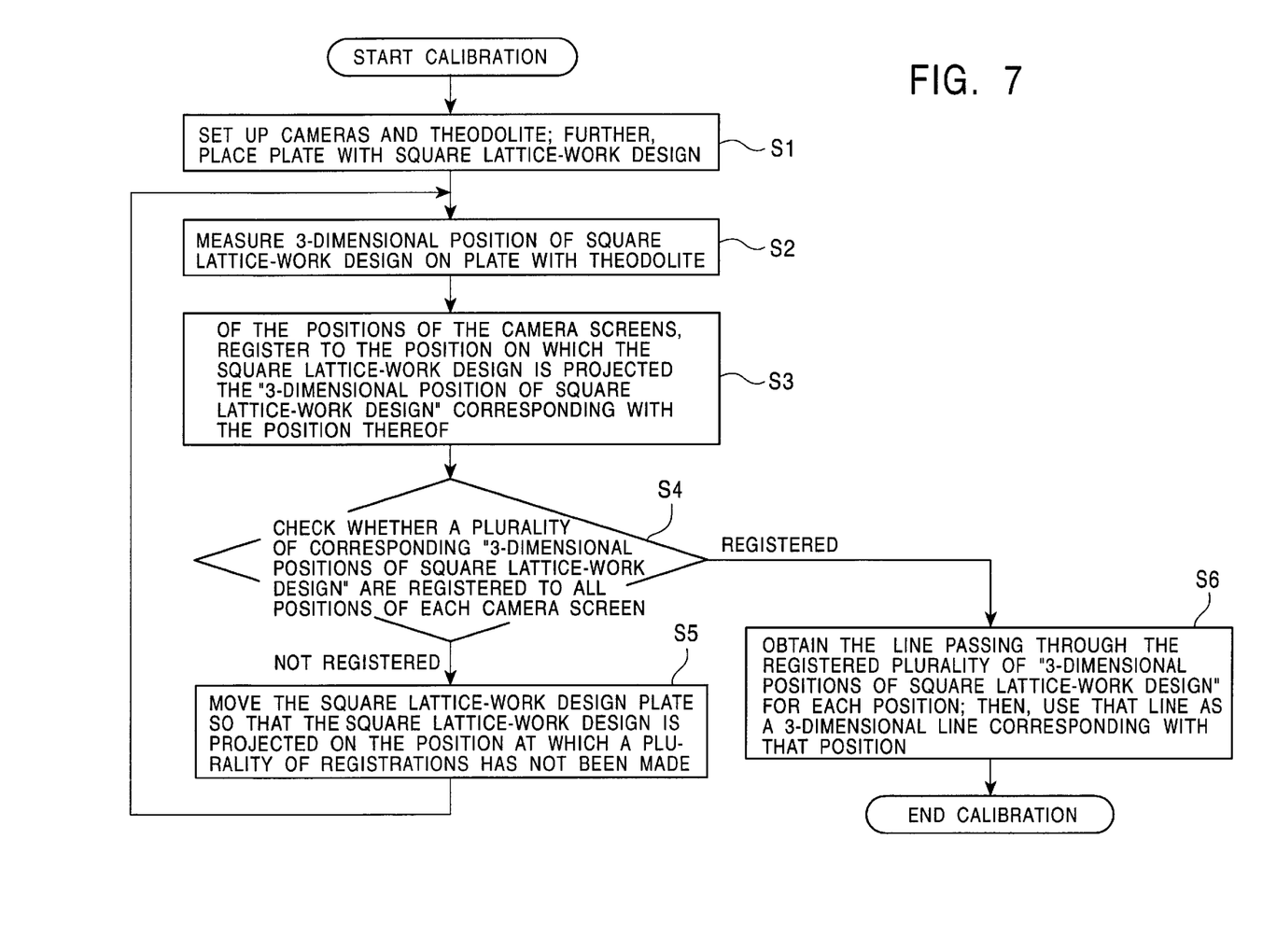
FIG. 7 is a flowchart for describing the operation of the embodiment shown in FIG. 6.

Next, description shall be made regarding the embodiment of the calibration device according to the present invention employing the above-described calibration method, with reference to FIG. 6 and FIG. 7. FIG. 6 is a block diagram of an embodiment of the calibration device according to the present invention, and FIG. 7 is a flowchart for describing the operation of the calibration device according to the present invention of which the construction is shown in FIG. 6.

In FIG. 6, the same components as those shown in FIG. 1 shall be dented with the same reference numerals, and description thereof is omitted. An input device 13 such as a keyboard can be used for input of the "position on the square lattice-work pattern (3-dimensional coordinates system with the world coordinates system as the reference)" the signal processing device 14 is a unit for calculating which line of the world coordinates system will be past upon which "position on the screen", based on the image data obtained from the first camera 1 and the second camera 2, and the "position on the square lattice-work pattern" input from the input device 13. The memory 15 is a memory unit for storing the correlated relation between the "position on the screen" obtained from the signal processing device 14 and the "line on the world coordinates system".

First, in step Si in FIG. 7, the positions of the first camera 1 and the second camera 2, and the theodolite 4 are set. Then, the square lattice-work pattern plate 5 is set in place. The theodolite 4 serves as the origin of the world coordinates system.

Next, in step S2, the position of the square lattice-work pattern (3-dimensional coordinates system with the world coordinates system as the reference) is measured with the theodolite 4. This measurement method is as described with FIG. 5 and the Expressions 1 through 4. The measurement results are input from the input device 13, and supplied to the signal processing device 14.

Next, in step S3, imaging is performed with the first camera 1 and the second camera 2. The image data thus obtained is sent to the signal processing device 14. Then, the following processing is performed at the signal processing device 14 only regarding positions on the screen of each camera onto which the square lattice-work pattern is projected.

That is, the "position on the square lattice-work pattern (position on the world coordinates system)" projected on the "certain position on the screen" is checked, and the "position on the square lattice-work pattern" is registered as a 3-dimensional position corresponding with the "position on the screen".

Next, in step S4, the signal processing device 14 checks whether two or more "positions on the square lattice-work pattern" are registered to each "position on the screen". In the event that there are not two or more registered, the flow proceeds to step S5. In the event that there are two or more registered, the flow proceeds to step S6.

In step S5, the plate is moved so that the square lattice-work pattern is projected on the point "position on the screen" at which only one or none are registered. Then, the flow returns to step S2.

In the state of proceeding to step S6, two or more "positions on the square lattice-work pattern (positions on the world coordinates system)" are registered to each "position on the screen". In step S6, the signal processing device 14 calculates the line in the 3-dimensional space which passes through the registered "positions on the square lattice-work pattern (positions on the world coordinates system)". This line is stored in the memory 15 as a line which corresponds with the "position on the screen".

The line stored in this memory 15 is data for calibration from the aforementioned imaging device for obtaining positional information of the aforementioned object in the 3-dimensional space.

It can be restated that this data for calibration is generated by means of a calibration data generating method which: receives data indicating 3-dimensional position information of a reference object which is provided with a drawn pattern and which has been measured multiple times by a 3-dimensional position information measuring device; receives image data indicating the aforementioned pattern which has been measured multiple times by the above imaging device; and generates data for calibration based on both types of data.

Thus, calibration is completed.

In practice, following completion of calibration, the object is photographed with the above stereo camera. The resulting image data is sent to the image processing device 14. Let us say that a certain object has been projected at a certain position on the screen of the first camera and a certain position on the screen of the second camera. At this time, the lines corresponding with that position on the screen of the first camera and the position on the screen of the second camera are read from the memory 15, and the intersection of the two lines is calculated by the image processing device 14. The resulting 3-dimensional coordinates are output as the world coordinates (3-dimensional coordinates system) of the object. Thus, 3-dimensional viewing of the object using the stereo camera is performed following completion of calibration.

Also, in the above example, the theodolite was used for measuring the position of each point in the square lattice-work pattern, but measurement may be carried out using a total station as a separate measurement device. A total station is not only capable of measuring at which angle the object exists as to a reference coordinates system as with the theodolite, but also measures the distance to the object. Accordingly, the direction and distance to each point on the square lattice-work pattern can be found, so the 3-dimensional position of each point can be obtained. The 3-dimensional positions of each point may be measured using such a total station.

Also, in the above embodiment, the arrangement involves the "position on the screen" and the "line on the world coordinates system" being stored as calibration results, but the present invention is by no means restricted to such; rather, any information will suffice to be stored as long as it correlates the position on the world coordinates system and the positions on the two screens of the stereo camera. For example, an arrangement may be used wherein "positional information of the world coordinates system" which is comprised of a "line on the world coordinates system" being sampled at even intervals for each "position on the screen", is stored.

Also, an arrangement may be used wherein "position on the screen" of the second camera corresponding with "positional information of the world coordinates system" which is comprised of a "line on the world coordinates system" being sampled at even intervals for each "position on the screen" of the first camera, is stored, and also, the positional information of the object for each "position on the screen" of the second camera is stored.

Also, in the above embodiment, a "line on the world coordinates system" is to be obtained as the result of calibration, but the present invention is by no means restricted to such; rather, a curve may be obtained by means of processing such that three or more "positions on the square lattice-work pattern" are registered. This enables absorbing margin of error owing to differences in properties such as aberration of optical lenses.

Further, the present invention may be applied to calibration of single cameras, as well. Calibration of a single camera consists of finding which direction on the world coordinates system images on each position on the camera screen (CCD plane) the image came from. In other words, all objects on a line on the worlds coordinates system are projected onto a single point on the screen; calibration of a single camera consists of finding the relation between the point on the screen and the line. In this case, the single camera regarding which the above calibration is to be made is considered to be-the first camera and set in the calibration device according to the present invention, and calibration is carried out without setting a second camera. This allows for calibration of the first camera alone.

Incidentally, the above calibration processing may be processed with software by a CPU (Central Processing Unit) processed within the above signal processing device 14, or may be processed by hardware logic, according to the arrangement. In the event that processing is to be carried out by software, control commands are read from the memory 15 or from a magnetic disk, optical disk, OM disk or the like provided within the signal processing device 14, so as to be processed by the above CPU. Also, an arrangement may be used wherein the control commands are provided from a separate device via an interface provided to the signal processing device 14 leading to a transferring medium such as a network or the like.

The calibration method and device according to the present invention perform calibration of an imaging device based on: 3-dimensional coordinates at least two positions on a pattern drawn in a reference object which is changed in position within a 3-dimensional space confined to the range in which the imaging device performs imaging; and image data obtained by the above imaging device performing imaging of the above pattern on the above reference object; hence, calibration with high precision can be carried out using a reference object upon which is drawn a square lattice-work pattern of a size which enables precision work.

The calibration data generating method according to the present invention generates data for calibration by: receiving data indicating 3-dimensional position information of a reference object which is provided with a drawn pattern and which has been measured multiple times by a 3-dimensional position information measuring device; receiving image data indicating the aforementioned pattern which has been measured multiple times by the above imaging device; and generates data for calibration on a 3-dimensional space projected on each position of the screen(s) of the above imaging device, based on both types of data, hence, calibration with high precision can be carried out using a reference object upon which is drawn a square lattice-work pattern of a size which enables precision work.

What is claimed is:

1. A calibration method for calibrating an imaging device for determining positional information of an object in a 3-dimensional space based on 2-dimensional images obtained from said imaging device,
   wherein calibration of said imaging device is carried out based on:
   at least two 3-dimensional coordinates positions of a reference object set within a 3-dimensional space corresponding to a range in which said imaging device performs imaging, each of the at least two positions corresponding to a respective covered portion of a screen of said imaging device; and
   image data obtained by said imaging device performing imaging of said reference object at each set position.

2. A calibration method according to claim 1, wherein a group of points on the 3-dimensional space projected to each position of the screens of said imaging device is calculated, by means of finding the 3-dimensional coordinates position of a pattern on said reference object which is projected to each position of the screens of said imaging device.

3. A calibration method according to claim 2, wherein a square lattice-work pattern is drawn on said reference object.

4. A calibration method according to claim 2, wherein said group of points is a collection of points on a line.

5. A calibration method according to claim 1, wherein a theodolite is used as a 3-dimensional positional information measuring machine for measuring said 3-dimensional positions.

6. A calibration method according to claim 1, wherein a total station is used as a 3-dimensional positional information measuring machine for measuring said 3-dimensional positions.

7. A calibration device for calibrating an imaging device for determining positional information of an object in a 3-dimensional space based on 2-dimensional images obtained from said imaging device, said calibration device comprising:
   a reference object set in a 3-dimensional space within a range in which said imaging device performs imaging of said object;
   3-dimensional position information measuring means for measuring a 3-dimensional coordinate position of said reference object; and
   control means for generating calibration information for said imaging device, based on at least two 3-dimensional coordinates positions of said reference object set within a 3-dimensional space corresponding to said range in which said imaging device performs imaging, each of the at least two positions corresponding to a respective covered portion of a screen of said imaging device; and
   image data obtained by said imaging device performing imaging of said reference object at each set position.

8. A calibration device according to claim 7, wherein said control means calculates a group of points on the 3-dimensional space projected to each position of the screens of said imaging device, by means of finding the 3-dimensional coordinates position of a pattern on said reference object which is projected to each position of the screens of said imaging device.

9. A calibration device according to claim 8, wherein a square lattice-work pattern is drawn on said reference object.

10. A calibration device according to claim 8, wherein said group of points is a collection of points on a line.

11. A calibration device according to claim 8, wherein a theodolite is used as said 3-dimensional positional information measuring machine.

12. A calibration device according to claim 7, wherein a total station is used as said 3-dimensional positional information measuring machine.

13. A calibration data generating method for generating data for calibrating an imaging device which determines positional information of an object in a 3-dimensional space based on 2-dimensional images obtained from said imaging device, said method comprising the steps of:

receiving data indicating 3-dimensional position information of said reference object which has been measured multiple times by a 3-dimensional position information measuring device;

receiving image data of said reference object which has been measured multiple times by said imaging device; and generating data for calibration for said imaging device, based on obtaining a 3-dimensional space position from at least two positions of said reference object set within a 3-dimensional space corresponding to portions of a screen of said imaging device which corresponds to a range in which said imaging device performs imaging, and image data obtained by said imaging device performing imaging of said reference object at each set position.

14. A calibration data generating method according to claim 13, wherein a theodolite is used as said 3-dimensional positional information measuring machine.

15. A calibration data generating method according to claim 13, wherein a total station is used as said 3-dimensional positional information measuring machine.

16. A calibration data generating method according to claim 13, wherein said calibration data on said 3-dimensional space is a collection of points on a line projected on each position of the screens of said imaging device.

17. A calibration data generating device for generating data for calibrating an imaging device which determines positional information of an object in a 3-dimensional space based on 2-dimensional images obtained from said imaging device, said calibration data generating device comprising;

a first receiving unit for receiving data indicating 3-dimensional position information of said reference object which has been measured multiple times by a 3-dimensional position information measuring device;

a second receiving unit for receiving image data of said reference object which has been measured multiple times by said imaging device; and a control unit for generating data for calibration for said imaging device, based on obtaining a 3-dimensional space position from at least two positions of said reference object set within a 3-dimensional space corresponding to portions of a screen of said imaging device which corresponds to a range in which said imaging device performs imaging, and image data obtained by said imaging device performing imaging of said reference object at each set position.

18. A calibration data generating device according to claim 17, wherein a theodolite is used as said 3-dimensional positional information measuring machine.

19. A calibration data generating device according to claim 17, wherein a total station is used as said 3-dimensional positional information measuring machine.

20. A calibration data generating method according to claim 17, wherein said calibration data on said 3-dimensional space is a collection of points on a line projected on each position of the screens of said imaging device.

21. An information providing medium which provides control information for calibrating an imaging device for determining positional information of an object in a 3-dimensional space based on 2-dimensional images obtained from said imaging device, wherein calibration of said imaging device is carried out based on:

at least two 3-dimensional coordinates positions of said reference object set within a 3-dimensional space corresponding to a range in which said imaging device performs imaging, each of the at least two positions corresponding to a respective covered portion of a screen of said imaging device; and image data obtained by said imaging device performing imaging of said reference object at each set position.

* * * * *